United States Patent [19]

Bohman et al.

[11] 4,275,546
[45] Jun. 30, 1981

[54] STONE DISCRIMINATOR

[75] Inventors: Carl E. Bohman, New Holland, Pa.; Peter G. Mitchell, Concord, Mass.

[73] Assignee: Sperry Corporation, New York, N.Y.

[21] Appl. No.: 109,932

[22] Filed: Jan. 4, 1980

[51] Int. Cl.³ .................. A01D 75/18; A01F 12/16
[52] U.S. Cl. .............................. 56/10.2; 130/27 JT
[58] Field of Search ................... 56/DIG. 15, 10.2; 130/27 JT

[56] References Cited

U.S. PATENT DOCUMENTS

| | | | |
|---|---|---|---|
| 3,101,721 | 8/1963 | Fuller | 130/27 JT |
| 3,606,745 | 9/1971 | Girodat | 56/DIG. 15 |
| 3,610,252 | 10/1971 | De Coene et al. | 56/DIG. 15 |
| 3,675,660 | 7/1972 | Girodat | 56/DIG. 15 |
| 3,771,530 | 11/1973 | Wassell | 130/27 JT |
| 3,805,798 | 4/1974 | Girodat | 56/DIG. 15 |
| 3,896,608 | 7/1975 | Garrott | 56/DIG. 15 |
| 3,935,866 | 2/1976 | Northrup et al. | 56/DIG. 15 |
| 3,971,390 | 7/1976 | McDuffie et al. | 56/DIG. 15 |
| 4,004,289 | 1/1977 | Kirk | 56/DIG. 15 |

FOREIGN PATENT DOCUMENTS

| | | | |
|---|---|---|---|
| 2002903 | 2/1979 | Australia | 56/DIG. 15 |
| 2448745 | 4/1976 | Fed. Rep. of Germany | 56/DIG. 15 |

Primary Examiner—Paul J. Hirsch
Attorney, Agent, or Firm—Howard P. Terry

[57] ABSTRACT

An illustrative embodiment of the invention provides an acoustic sensor for detecting stones and other hard foreign objects mixed within crop material in a harvesting machine susceptible to damage thereby. The acoustic sensor comprises a sensing surface disposed within an input path in the harvesting machine for impacting engagement with the flow of crop material therein and an acoustic sensing device coupled to the sensing surface for detecting acoustic vibrations induced within the sensing surface as a result of impact therewith by stones and other foreign objects mixed within the crop material. The sensor provides electrical signals in response to the acoustic vibrations indicative of the impact of the crop material and the foreign objects with the sensing surface and includes isolation means for obviating the effects of extraneous acoustical signals of the same character as the foreign object impacting signals to accentuate the foreign object impacting signals and thereby reduce the false alarm signals.

13 Claims, 10 Drawing Figures

STONE DISCRIMINATOR

BACKGROUND OF THE INVENTION

1. Field of the Invention

This invention relates to agricultural machines and, more particularly, to means for detecting foreign objects, such as stones, collected along with the crop material being harvested.

2. Description of the Prior Art

Harvesting machines such as combine harvesters (hereinafter referred to as a combine) are susceptible to damage by foreign objects such as stones and other hard objects (hereinafter referred to simply as "stones") ingested therein during the harvesting process. Stone detecting and eliminating systems for protecting the combine are known in the prior art. For example, U.S. Pat. Nos. 3,675,660 and 3,805,798 entitled "Combine Stone Trap Door" and "Combine Harvester Protection System", respectively, both in the name of C. F. Girodat and both assigned to Massey, Ferguson Industries, disclose detector systems for eliminating rocks from a combine in which a piezoelectric element, attached to the bottom of the combine's header table assembly, generates output signals in response to acoustical vibrations induced therein. The electrical signals, moreover, are filtered and if of sufficient amplitude, indicative of a stone are applied to a trap door, a declutching mechanism or a combination thereof for eventual elimination of the object.

The known detection and elimination systems are subject to serious disadvantages, however. For example, directly coupling the piezoelectric element or stone detector system to the bottom of the combine's header table assembly subjects the system to spuriously induced vibrations or signals such as those due to the interaction of the moving mechanical members of the combine, to "stones" outside the combine which make contact therewith and due to the impact of the table assembly with the ground. These interactions involve relatively hard materials resulting in characteristic acoustical vibrations induced in the sensor similar to those vibrations created by the "stone"-sensor surface contact which the system is attempting to detect. Accordingly, the spurious or false signals or those acoustic vibrations of the same character as the "stone"-sensor surface contact will result in an increased false alarm rate resulting in, for example, unnecessarily activating the trap door mechanism. As spurious signals or an increased false alarm rate results in lost time and crop material, sensitivity of the system may be reduced to decrease the effect of the spurious signals. However, a reduced sensitivity increases the chances that some stones will not be detected resulting in machine damage.

The detector and eliminator systems of the prior art have several further limitations with respect to the sensor system and elimination means and lost crop material. Typically, each combine uses at least two headers, such as a direct-cut header and a corn header, for different crops. Additionally, the direct-cut headers may be adapted for particular crops by using a pick-up header attachment, a soybean pick-up reel, or a grain bat reel. If the piezoelectric element of the detector system is disposed within the table assembly of the header, a sensing device must be incorporated in each header of a single combine. For example, the table assembly of the header is typically 12 to 20 feet in width whereas the feeder housing or crop elevator which is fed by an auger in the header is generally about 40 inches in width. Accordingly, the flow of material in the table assembly is much slower than in the crop elevator. Moreover, as the eliminating system, conventionally a trap door, is generally disposed within the crop elevator, there is a substantial difference in the time of detection and elimination of the stone from one portion of the header as compared to the time of detection and elimination from another portion. Thus, in order to insure the elimination of the stones from the harvested crop, the trap door must remain open for a relatively long period of time permitting substantial amounts of crop to be lost.

In addition, it is apparent that unless virtually all of the "stones" gathered by the combine are insured of contacting the detector system, regardless of the size thereof, or the amount of crop material being harvested, a substantial number of non-contacting and, therefore, non-detected stones will be transported with the crop material into the threshing components of the combine where substantial damage may result.

Accordingly, there is a need for a "stone" detector system which will overcome or at least alleviate the problems associated with the prior art systems as described hereinabove and which insures the detection of virtually all of the stones entering the combine.

SUMMARY OF THE INVENTION

In accordance with the invention, the aforementioned difficulties with respect to crop wastage, false alarm signals and the assurance of detecting virtually every stone gathered during harvesting are to a great extent alleviated through the practice of this invention. Specifically, an embodiment of the invention comprises a stone detector system disposed within the crop elevator of the combine. More specifically, an embodiment of this invention comprises a "stone" detector disposed in operative relationship in the crop material input path and includes a transducer, preferably a piezoelectric crystal, acoustically coupled to a sensing surface disposed transversely across the floor of the input path. The stone detector incorporates means for selecting the detected "stone" signal from spurious signals or extraneous false vibrations in order to actuate a threshold means. More specifically, an embodiment of the invention incorporates acoustic isolation means coupled to the sensing surface to suppress or isolate extraneous false acoustic vibrations of the combine of the same character as the "stone" detection signal from the sensing device; whereas, a further embodiment of this invention includes a circuit having two filtering means for selecting the detected stone signal from the spurious signals of the same character as the detected stone signal. In addition, an embodiment of this invention includes means for controlling the direction of flow of crop material and stones gathered therewith such that all of the material, crop and foreign object, picked up by the header is directed towards the sensing device to impact therewith to assure detection of all of the "stones" gathered during the harvesting.

BRIEF DESCRIPTION OF THE DRAWINGS

FIG. 3 is a block diagram depicting the electrical circuit of the present invention.

DESCRIPTION OF THE PREFERRED EMBODIMENT

Figure 1:
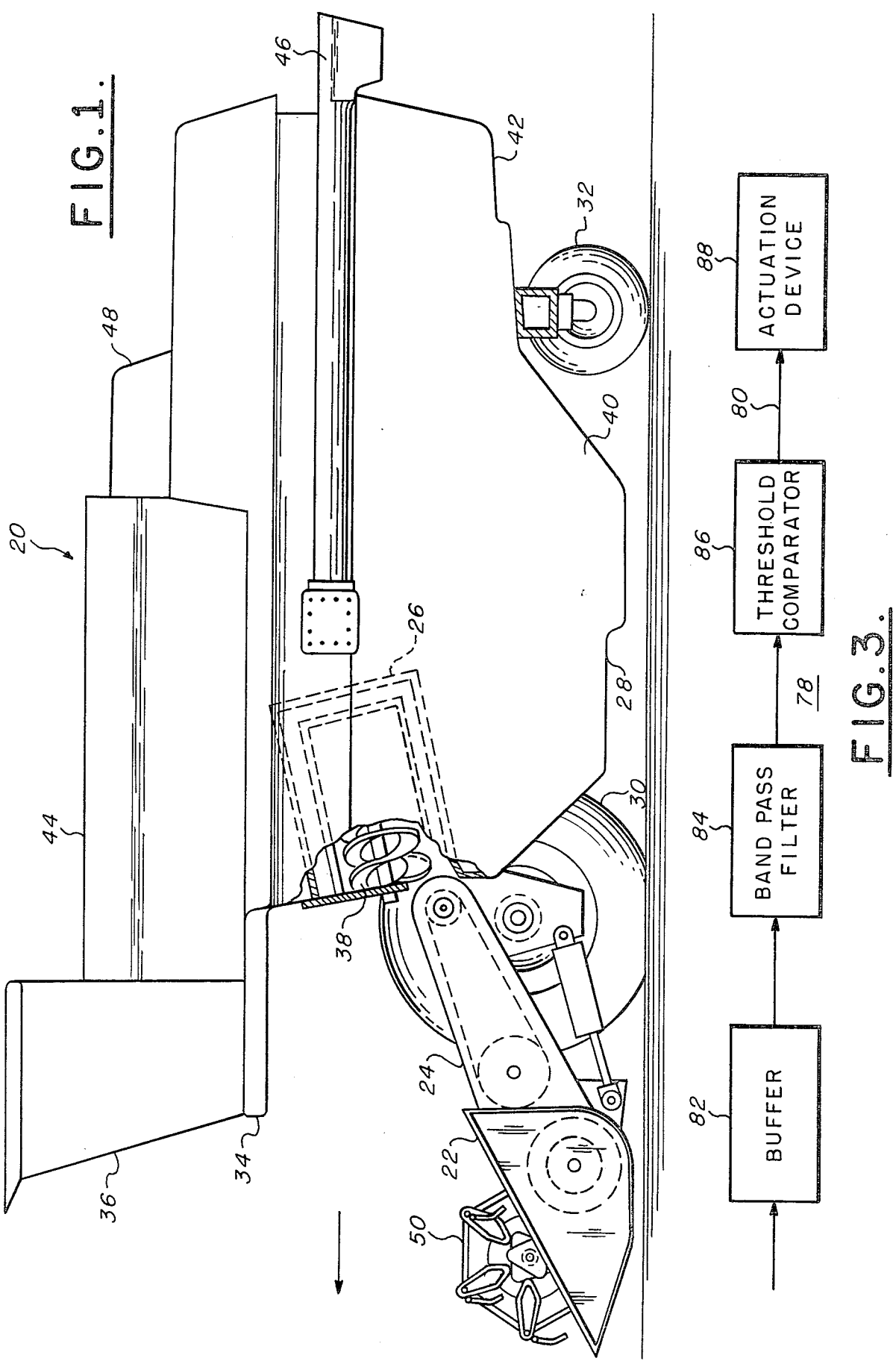
FIG. 1 is a side view illustration of a combine partially in section.

For a more complete appreciation of the invention, attention is invited to the following description of an illustrative embodiment of the invention. The threshing and separating machine described herein is a self-propelled combine 20 shown in FIG. 1 of the drawings having a header 22 supported by a crop elevator 24. The crop elevator 24, in accordance with the header 22, operates to deliver crop material from the field to threshing and separating means 26 within the combine. The combine 20 is mounted on a frame 28 which is supported by a pair of large front drive wheels 30 and a pair of rear mounted steering wheels 32 (only one wheel of each pair being shown in the figure). Mounted to the front of the combine is the operator's platform 34 extending forwardly over the crop elevator 24. A cab 36 usually encloses the platform and protects the operator from the dust, dirt and heat generally encountered during the harvesting operation.

The threshing and separating means 26 may extend transverse to the direction of travel (arrow A in the figure) of the combine, as in conventional combines, or in a fore and aft relationship as depicted in FIG. 1. The particular configuration of the threshing and separating means has no relevance to the description of the present invention as either type may be used in conjunction with the invention. The forward most portion of the threshing and separating means 26 contains a crop feeding means 38 which acts in direct communication with the crop elevator 24 and header 22 to deliver material from the field into the threshing and separating means 26. The crop cleaning means 40 is housed in the lower portion of the combine between the drive and the steering wheels. Chaff separated from the grain, by the cleaning means, and straw, exiting the threshing and separating means, are discharged through an opening 42 contained in the rear of the combine. A grain tank 44 is mounted on top of the combine for temporarily storing clean grain and, an unloading auger 46 is mounted on the combine for discharging grain contained in the grain tank 44. Mounted to the rear of the grain tank is the engine 48 connected by various drives (not shown) to the threshing and separating means 26, the crop cleaning means 40, the drive wheel 30, the crop elevator 24 and the header 22.

Figure 2:
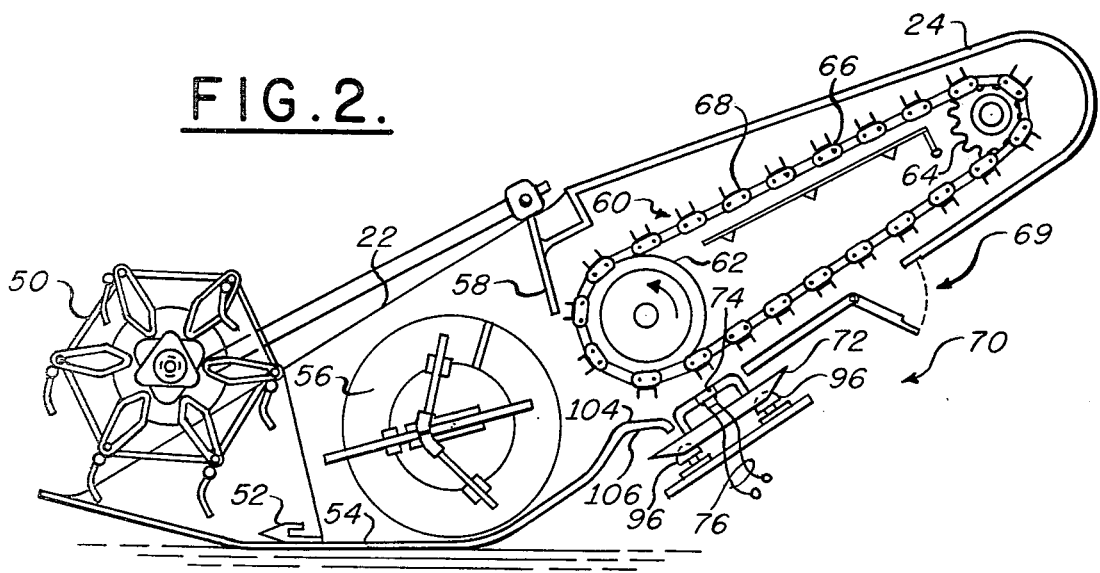
FIG. 2 is a partial side view of the header and crop elevator of the combine illustrating the invention disposed within the crop elevator.

Referring now to FIG. 2, the header 22 and the crop elevator 24 also known as the feeder housing are more clearly shown at an increased scale. The header 22 has a reel 50 and a sickle or cutter bar 52 for gathering and cutting the standing crop material. The severed crop material is directed over the surface of the table assembly 54 to a transverse auger 56 positioned to the rear of the reel 50 to consolidate the harvested crop material and to deliver it to the entrance 58 of the crop elevator 24. The header is substantially wider than the combine and usually extends transversely to or beyond the drive wheels. The crop elevator, however, is usually narrower than the header for delivering the material from the auger 56 upwardly and rearwardly to the crop feeding means 38. The crop elevator includes a rotatably mounted chain and slat conveyor 60 coupled to an idler drum 62 disposed at and extending across the front of the crop elevator immediately to the rear of the entrance 58. A power transmitting sprocket means 64 is rotatably mounted to the rear of the crop elevator immediately in front of an opening to the crop in feed area of the threshing means. The chain and slat conveyor includes a plurality of endless flexible chains 66 spaced across the drum 62 and slats 68 for transporting the crop material along the input path formed by the crop elevator 24 to the threshing and separating means.

Figure 4:
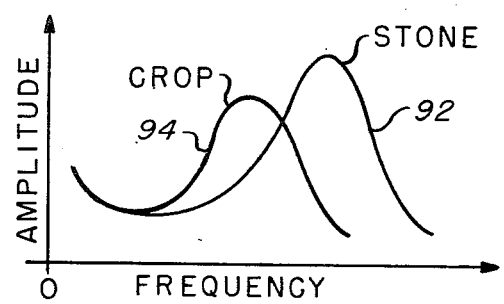
FIG. 4 is a graphical schematic of the impact amplitude versus frequency of crop material and stones on the sensing device of the present invention.

FIG. 2 also depicts, in part, the apparatus comprising the present invention. An acoustic sensing device 70 including a sensor bar 72, preferably a steel bar or plate, and an acoustic sensing transducer 74 attached to the bar is disposed across the width of the floor of the crop elevator 24. The transducer 74 typically, a disk shaped piezoelectric crystal is attached to the sensing bar 72 or inserted in a contoured recess located in the backside of the bar, away from the material flow, and is secured therein in any appropriate manner. In response to material including "stones" striking the upper surface of the sensing bar 72 causing acoustic vibrations therein, the piezoelectric crystal or transducer 74 detects the acoustical vibrations and generates electrical signals, along lines or circuit leads 76. The frequency and amplitude of the electrical signals vary as a function of the characteristic of the acoustic vibrations in the bar as a result of crop material and/or stone impact. The electrical signals, moreover, are coupled to appropriate circuit means for detection of the "stones" disposed in the crop material. Referring now to FIG. 3, a processing circuit 78, illustrated in block diagram form, provides a signal 80 indicative of the presence of a "stone" within the crop material. The circuit 78 includes a buffer circuit 82 which receives the electrical signals from the piezoelectric crystal in response to vibrations of the bar 72 and provides a properly matched interface between the remainder of the processing circuitry and the transducer 74. From the buffer circuit 82, the signals are coupled to a bandpass filter circuit 84. The acoustic sensing bar 72 has a spectrum of line frequencies to which it is mechanically resonant, wherein these frequencies are excited by impact of material against the bar. It should be noted, however, that these line frequencies do not stand out, because the bar is well damped, as explained hereinbelow, and because the excitation arises from many incoherent impulses. The frequencies are distinguishable only in a broader sense, which results from the fact that the impact of a hard surface material is able to generate higher frequency sound. This results in the acoustic energy from impact being concentrated into different bands, with the distribution of energy of stone impacts being at a higher frequency than the energy distribution of softer surface materials such as corn cobs. FIG. 4 is a graphic illustration of the characteristic amplitude as a function of frequency for crop material and stones impacting the bar. As shown, the characteristic frequencies 92 excited by a stone, although generally of greater frequency than the frequencies 94 excited by a softer surface such as grain or corn, are not rigidly fixed within the frequency spectrum. Accordingly, the value of the resonant frequencies for a particular sensing device should be measured so that the center frequency of the bandpass filter 84 may be aligned to envelop the greater or higher in value resonance frequencies induced by the hard object or stones to be detected. In addition, the bandwidth of the bandpass filter 84 is also significant and should be chosen to best match the time characteristics of the impact signal. A wideband allows greater response to initial high amplitude signals induced immediately after impact, whereas a narrow bandwidth has the effect of averaging the response over longer duration. Accordingly, the bandwidth of the bandpass filter circuit 84 is chosen therebetween depending upon the characteristics of the signals 92 transmitted by the sensing bar 72 in cooperation with the piezoelectric crystal transducer 74. The bandpass filter circuit 84 attenuates all signals not falling within the passband, whereas, those signals whose frequencies fall within the passband and thereby initially represent the detection of a stone in the crop elevator are coupled to a threshold comparator circuit 86 (FIG. 3). The threshold comparator circuit 86 compares the amplitude of the signal from the bandpass filter 84 with the amplitude of a preselected or predetermined threshold value deemed to be indicative of a stone and generates the signal 80 indicative of the presence of the stone when the threshold value is exceeded. The actuating signal 80 may be coupled to any suitable actuation device 88 such as warning means, lights or alarms, or trap door 69 as shown in FIG. 2 and known in the art as in U.S. Pat. No. 3,971,390 assigned to the assignee of the instant application for alerting the driver and preventing the introduction of the stone into the threshing means 26 of the combine.

As indicated above, spurious or false signals of the same character or characteristics as the "stone" signals to be detected may be induced within the combine, and more specifically, within the acoustic sensor 70 due to the interaction of, for example, the moving mechanical parts within the combine or due to noises of similar character as a stone impact conducted to the sensor bar from outside the flow of crop within the crop elevator. These spurious or false signals may be isolated or suppressed as indicated herein such that exclusive detection of stones within the combine is assured.

Figure 5:
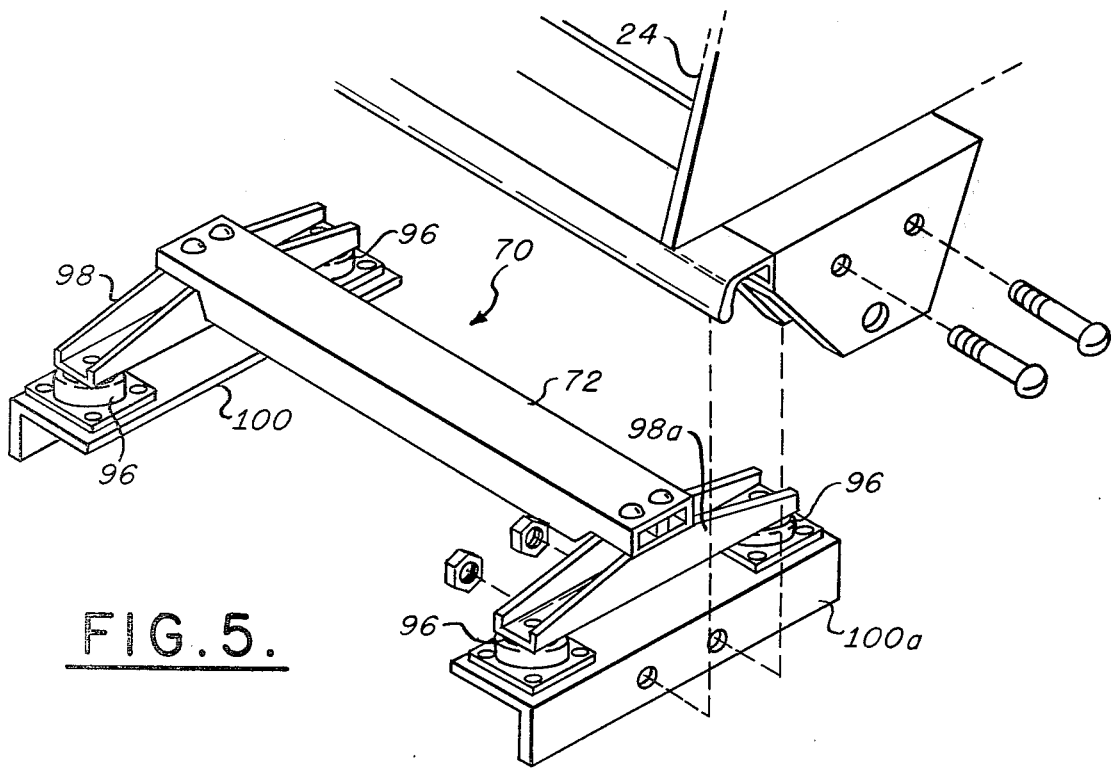
FIG. 5 is a mechanical illustration depicting the apparatus for acoustically isolating the sensing device from the combine.

An embodiment of this invention comprises means coupled to the sensor of this invention to obviate or lessen the effect of spurious acoustic signals, which may be induced in or excited by the bar, and which have the same character as the signals of a stone hitting the bar 72, thereby ensuring that only stone impacts on the sensor bar are recognized. The preferred embodiment of the instant invention includes vibration isolators 96 shown in FIGS. 2 and 5, for example, which are essential in isolating the bar 72 from spurious signals that have the same character as a stone signal. The vibration isolators 96 are coupled between the acoustic sensor 70 and the combine to suppress or isolate the sensor from the spurious signals generated within the combine which otherwise would be coupled to the transducer 74. Referring to FIG. 5, each end of the acoustic sensor 70 and specifically the bar 72 is secured, for example, to a yoke 98 and 98a, respectively, which is affixed to a mounting bracket 100 and 100a respectively, through the vibration isolators 96 such as Barry Cup-Mount C-2040-T6 isolators produced by the Barry Controls Corporation. The entire sensing device 70 and more particularly the brackets 100 and 100a are secured to the frame of the crop elevator 24 such that the sensing bar 70 is disposed in the plane of the floor of the crop elevator as shown in FIG. 2, with no physical contact between the sensing device and the crop elevator. Accordingly, the vibration isolators 96 acoustically isolate the sensing device from the bracket and more specifically from the combine and thereby prevent spurious or false signals from being induced within the bar 74. Although a space or air gap will exist along the transverse extent of the bar in the floor of the crop elevator through which some crop may be lost, this space or gap may be filled with an acoustically isolating material or spacer to prevent crop loss or deterioration of the acoustic isolation or more importantly the deterioration of the signal indicative of the presence of the stone.

Figure 6:
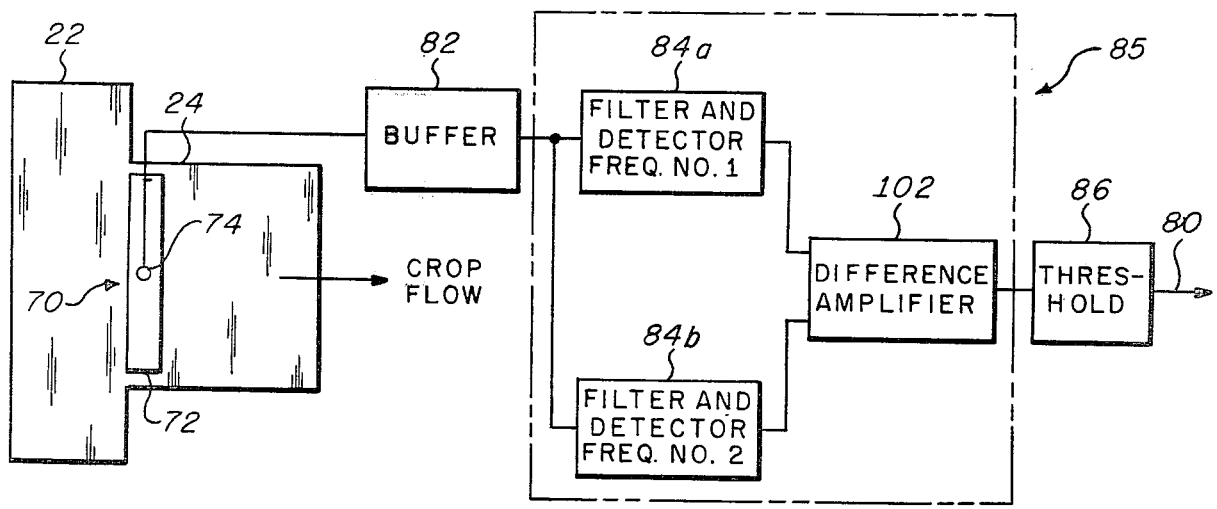
FIGS. 6, 7 and 8 are illustrations partially in block diagram form depicting electrical techniques for cancelling the detrimental effects of spurious acoustic vibrations.
Figure 7:
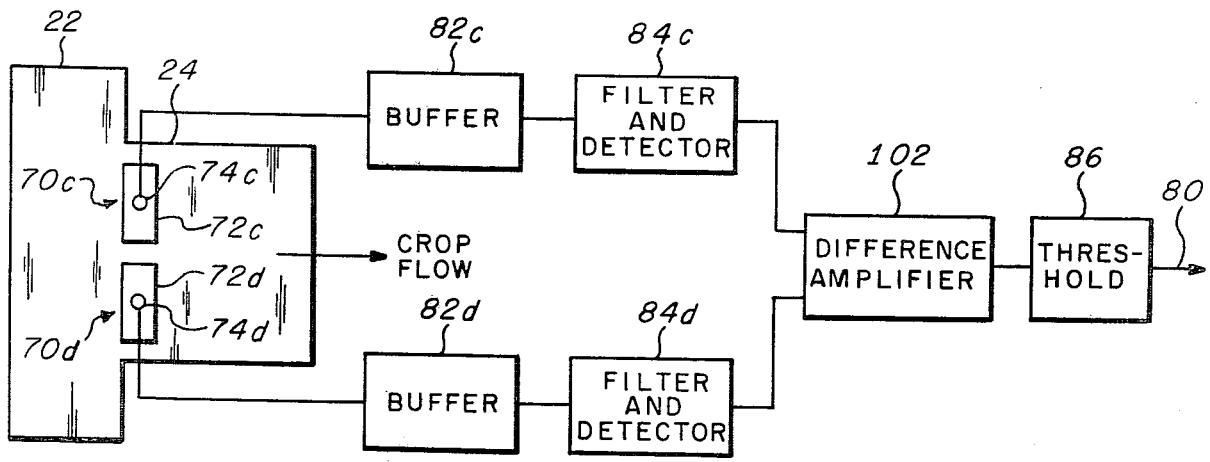
Figure 8:
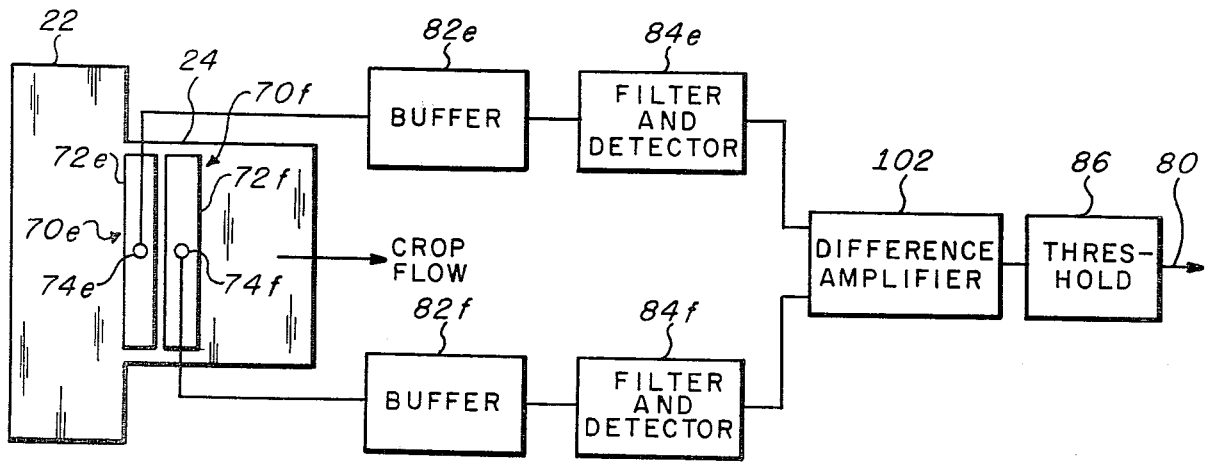

Referring to FIGS. 6, 7 and 8, three variations of electronic isolation means coupled to the acoustic sensor 70 to obviate the effect of signals of the same character as the stone impacting signal to be detected are illustrated for improving the performance of the sensor. The electronic isolation means illustrated allows the signal from the sensor to discriminate between sounds that are truly stones and those other noises induced or excited in the bar and, thereby, ensure that only the stone impact on the sensor bar is recognized. In this manner, false alarms are substantially eliminated. Specifically, the electronic differencing technique illustrated in FIGS. 6, 7 and 8 provide filtering schemes which sense the presence of a stone and lessen the effects of spurious noise or false signals. In the embodiment of FIG. 6, the apparatus of this invention including the electronic isolation means is illustrated in block diagram format similar to FIG. 3 comprising a buffer circuit 82 [it being realized that like numbers are utilized to indicate similar or like circuits or elements throughout] coupled to the sensor 70 disposed in the crop elevator 24. The buffer circuit provides a properly matched interface between the remainder of the processing circuitry and the transducer 74 as in FIG. 3. The buffer circuit 82 is coupled to a pair of parallel filter and detector circuits $84_a$ and $84_b$, respectively. As noted hereinabove and illustrated in FIG. 4, stone impacts exhibit a different distribution of amplitude with frequency than does the harvested crop material, has a spectrum of resonant frequencies, substantially distinctly separated from each other. Thus, the buffer circuit of FIG. 6 is coupled to a parallel pair of filter and detector circuits $84_a$ and $84_b$ each aligned with a different resonant frequency and each performs a function similar to the bandpass filter 84 of FIG. 3. The pass band of the filter and detector circuit $84_a$, for example, is selected to include one frequency band such as that induced by the stones, for example, 92 of FIG. 4, while the pass band of filter and detector circuit $84_b$ is selected to include a second characteristic frequency such as that induced by the impact of crop material, 94 of FIG. 4. The selected characteristic frequency includes the maximum amplitude frequency of the respective stone and crop signals. The detector circuit portion of filter and detector circuits $84_a$ and $84_b$ rectifies the input signals thereto providing an envelope of the signals. The output signals from both filter and detector circuits which may comprise the envelope of the input signals thereto, are suitably weighted and coupled to a difference amplifier 102. The balance is such that the signal in the lower frequency pass band of the crop noise dominates and holds the setting of the differential amplifier or comparator 102. When a stone strikes the bar, however, the signal in the higher frequency pass band momentarily becomes larger causing the amplifier to switch state. The output is coupled to the threshold circuit 86 which gives the alert or warning indicative of the presence of a stone in the crop material when the amplitude of the output from the difference amplifier exceeds a preselected value. The difference signal developed in the difference amplifier or comparator 102 provides a sensitive indication of the presence of stones in the gathered crop material which eliminates or obviates the effects of the unwanted spurious noise signals, and thereby, reduces false alarms from the noise signals.

The embodiments of the electronic differencing techniques of FIGS. 7 and 8 include a plurality of separate sensing systems having separate buffer and filter circuits respectively coupled to a difference amplifier such that the difference signal can be made sensitive to stone signals in one bar over and above the general sound level, of the other bar, and isolation of the spurious sounds may be readily detected. For example, in FIG. 7, two sensing systems $70_c$, $70_d$ are disposed in parallel, i.e., in side by side relation, transverse, across the floor of the crop elevator 24 each comprising a bar $72_c$, $72_d$ and transducer $74_c$ and $74_d$, respectively. Each sensor monitors a portion of the floor of the crop elevator 24 and the combination thereof spans the entire crop elevator such that a stone contacts one bar but not the other. Each sensor, moreover, comprises a buffer and a filter and detector circuit $82_c$, $82_d$ and $84_c$ and $84_d$, respectively. The output from the filter and detector circuits are each coupled to a difference amplifier 102 as previously indicated with respect to FIG. 6. This electronic circuit isolation means can then be made sensitive to vibrations in the bars which occur in one bar and not the other, but those vibrations which occur in both bars at substantially the same time and reach the differential amplifier with the same characteristic frequencies may then be isolated as being an induced, false, signal producing no output from the difference amplifier. Accordingly, only the strong accentuated impact sound of a stone hitting one of the bars $74_c$ or $72_d$, respectively, will be passed by the difference amplifier through a threshold circuit 86 as previously indicated to provide the sensitive indication of the presence of a stone in the gathered crop material. Likewise, in FIG. 8, two sensors $70_e$ and $70_f$, respectively, each comprise a bar $72_e$ and $72_f$ in series relation, that is, one in front of the other each spanning the floor of the crop elevator and each comprising a transducer $74_e$ and $74_f$. Each sensor includes a buffer $82_e$ and $82_f$ and a filter and detector circuit $84_e$ and $84_f$. The output of each sensor is coupled from the filter and detector circuit to a difference amplifier 102 and a threshold circuit 86 as explained hereinabove to provide the signal 80 indicative of a stone in the crop elevator. It is appreciated that the sensor means of FIGS. 7 and 8 are arranged such that the impacting signal of a stone on one of the associated sensor bars is accentuated whereas extraneous, spurious or false signals are suppressed, as they are induced in both bars in each figure with substantially the same character or characteristic frequency as the signal to be detected and are washed out by the difference amplifier 102. Thus, the sensing bars in both figures are arranged so that the "stones" mixed with the crop material in the crop elevator will impinge or impact on one or the other of the sensor bars, creating the impacting signal to be detected in the respective circuit, whereas in the other circuit no signal is generated. The difference amplifier 102 detects this difference and accentuates the detected signal by passing only this signal to the threshold 86. In like manner any spuriously induced vibrations will induce signals in each sensor and associated circuitry at substantially the same instant in time and will be cancelled in the difference amplifier. It should also be noted, that the electronic components depicted within block 85 of FIG. 6 may be substituted for the components designated $84_c$ and $84_d$ in FIG. 7 and $84_e$ and $84_d$ in FIG. 8.

Figure 9:
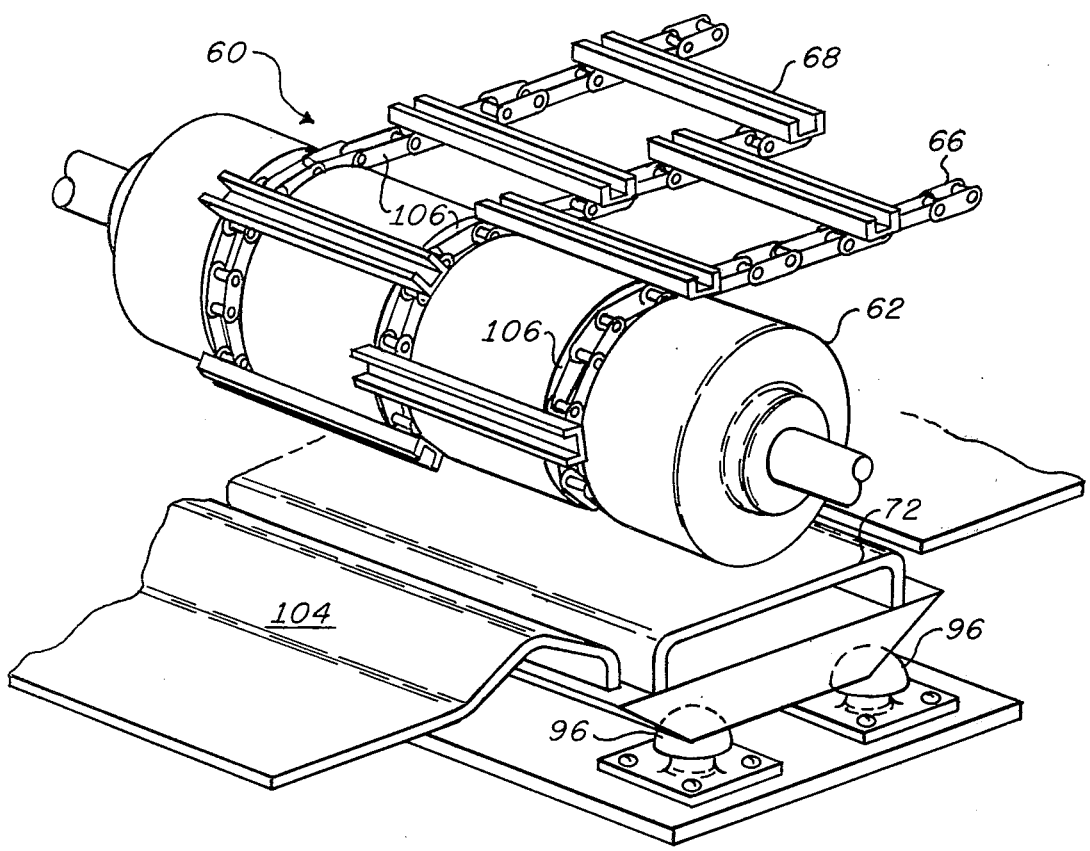
FIG. 9 is a schematic of the idler drum and elevator chain of the present invention.
Figure 10:
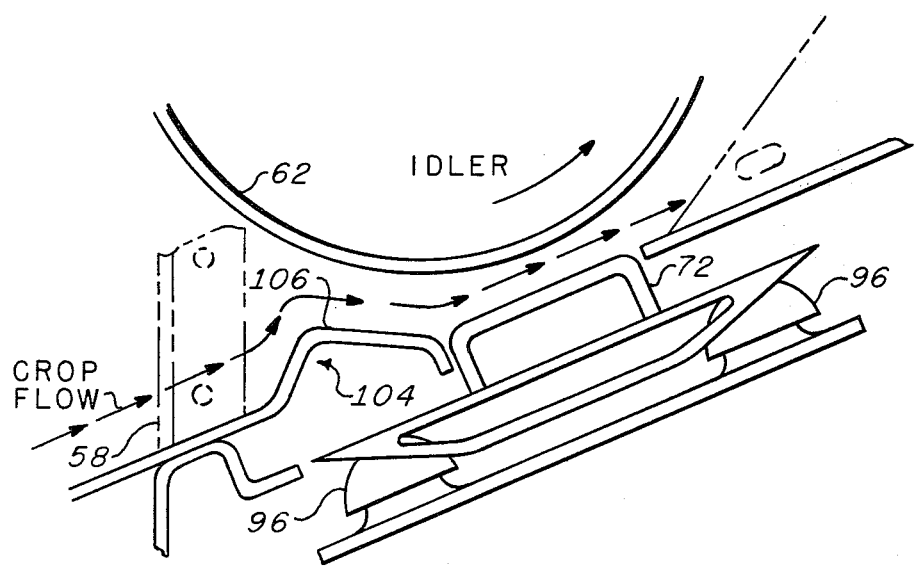
FIG. 10 schematically illustrates the sensing device of the invention including deflection means and acoustic isolation means for assuring the detection of all the "stones" in the crop material.

Controlled crop flow direction through the crop elevator, such that high energy contact, i.e., impact, between the material and the sensor or sensor bar 72 is desired and a strong stone signal is insured. As shown in FIGS. 2 and 9 and 10, deflector means 104 is disposed within the crop elevator and arranged to redirect or deflect the flow of material, indicated by arrows (FIG. 10), entering the crop elevator such that impact between the material and, in particular, stones and the sensor bar is insured. Specifically, the deflector means 104 includes a ramp 106 extending transversely across the floor of the crop elevator and upwardly therefrom to direct the flow of material upwardly from the floor of the crop elevator and then downwardly by the idler drum towards the sensor bar. In addition, as the crop material is directed upwardly by the ramp 106, the material is deflected off the idler drum 62 into impacting contact with the sensor bar 72. It is noted that the space between the slats and the idler drum is of significant dimension such that the clearance could lead to capture of stones therein between the drum and the slats. The captured stones may then bypass the sensor and be carried into the body of the combine. Therefore, the deflector means 104 of this invention may include further deflection means associated with the idler drum 62 (FIG. 2) wherein the idler drum has recessed slots 106 for engaging the chains 66, resulting in a drum of increased radius. In this manner, the slats 68 substantially contact the outer cylindrical surface portion of the drum thereby eliminating the space commonly associated therebetween and eliminating the possibility of having a stone captured therein and bypassing the sensor of this invention. The deflector means of this invention, therefore, increases the likelihood that the crop material and any stones entrained therein will impact the sensor bar 72 resulting in a strong signal.

In the operation of the preferred embodiment of this invention, the harvested material including stones is gathered by the header 22 as the combine travels over the ground and is fed into the crop elevator 24 by the auger 56. The flow of material impacts the sensor 70 and more specifically the sensor bar 72 from which the acoustical signals generated therein are detected by the transducer 74 which provides electrical impacting signals in response thereto. More particularly, isolation means, for example, the vibration isolators 96 indicated herein isolates the sensor 70 and eliminate the effects of noise from within and outside of the combine. The vibration isolators enable the detection of virtually all of the stones by accentuating the stone impacting signal over the background. The preferred embodiment of this invention further includes deflector means to direct the flow of the material within the crop elevator such that impacting contact with the bar is assured. It will be appreciated that, as the present invention is disposed in the crop elevator of the combine, even though various headers may be employed with each combine, a change in header will not detach or disconnect the present invention from the combine, and the location of the invention within the crop elevator reduces the time interval that an ejection means such as a trap door 69 is required to be open to remove the stone thereby decreasing crop loss.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In a harvesting machine susceptible to damage by a non-frangible foreign object included within crop material harvested from a field and fed into the harvesting machine along a predetermined path via a crop elevator, protective apparatus for providing a signal indicative of the presence of the non-frangible foreign object at a predetermined location along the predetermined path, comprising:

at least one sensing surface for traversing the flow of crop material in said crop elevator and for receiving impactions of crop material and foreign objects;

means for mounting at least one sensing surface in operative relationship to said crop elevator and including means for vibrationally isolating said sensing surface from said combine harvester;

piezoelectric transducer means attached to at least one sensing surface for providing output signals representative of the impactions of the foreign objects and the crop material;

means coupled to said piezoelectric transducer means for selecting said foreign object impact signal from other signals coupled thereto; and means coupled to said selection means responsive to said foreign object impact signal for generating a utilization signal useful for indicating the presence of said foreign object.

2. The apparatus according to claim 1 wherein said selection means includes filter means coupled to said transducer means for selecting electrical signals within a predetermined bandwidth; and said utilization signal generator means includes threshold comparator means coupled to said filter means for receiving the output signal of said filter means and for providing a signal representative of a foreign object in said crop material when the output signal of said filter means exceeds a predetermined threshold value.

3. The apparatus according to claim 1 wherein said selection means includes first and second filter means coupled to said piezoelectric transducer means for providing electrical output signals; and said utilization signal generator means includes difference amplifier means coupled to receive said output signal from said first and second filter means for comparing said respective output signals and providing a signal representative of a foreign object in said crop material.

4. The apparatus according to claim 2 wherein said sensing surface includes a single bar disposed within the harvesting machine and traversing the width of the crop flow.

5. The apparatus according to claim 3 wherein said sensing surface includes a single bar disposed within the harvesting machine and traversing the width of the crop flow.

6. The apparatus according to claim 2 wherein said sensing surface includes first and second bars for generating acoustic signals in response to impacts by said foreign object and said crop material, each coupled to said piezolectric transducer means for conversion to electrical signals representative of said foreign object and crop material impacts.

7. The apparatus according to claim 3 wherein said sensing surface includes first and second bars for generating acoustic signals in response to impacts by said foreign object and said crop material, each coupled to said piezoelectric transducer means for conversion to electrical signals representative of said foreign object and crop material impacts.

8. The apparatus according to claim 6 or 7 wherein said first and said second bars are disposed within the harvesting machine in a front to back relationship such that each bar individually traverses the width of the crop flow.

9. The apparatus according to claim 6 or 7 wherein said first and said second bars are disposed within the harvesting machine in a side to side relationship such that both bars collectively traverse the width of the crop flow.

10. The apparatus according to claim 4, 5, 6, or 7 further including deflector means for redirecting the course of travel of material entering the harvesting machine to assure impacting contact of said material with said sensor means.

11. The apparatus according to claim 10 wherein said deflector means further includes ramp means disposed in the crop material path to deflect the material for impact with the sensor means.

12. The apparatus according to claim 11 wherein said deflector means further includes an idler drum having a conveyor belt with slots operatively arranged thereon, said drum having recessed slots for substantially reducing the space between said slots and the surface of the drum.

13. The apparatus according to claim 12 wherein said utilization signal generator means is coupled to a foreign object removal device.

* * * * *